Patented Jan. 24, 1933

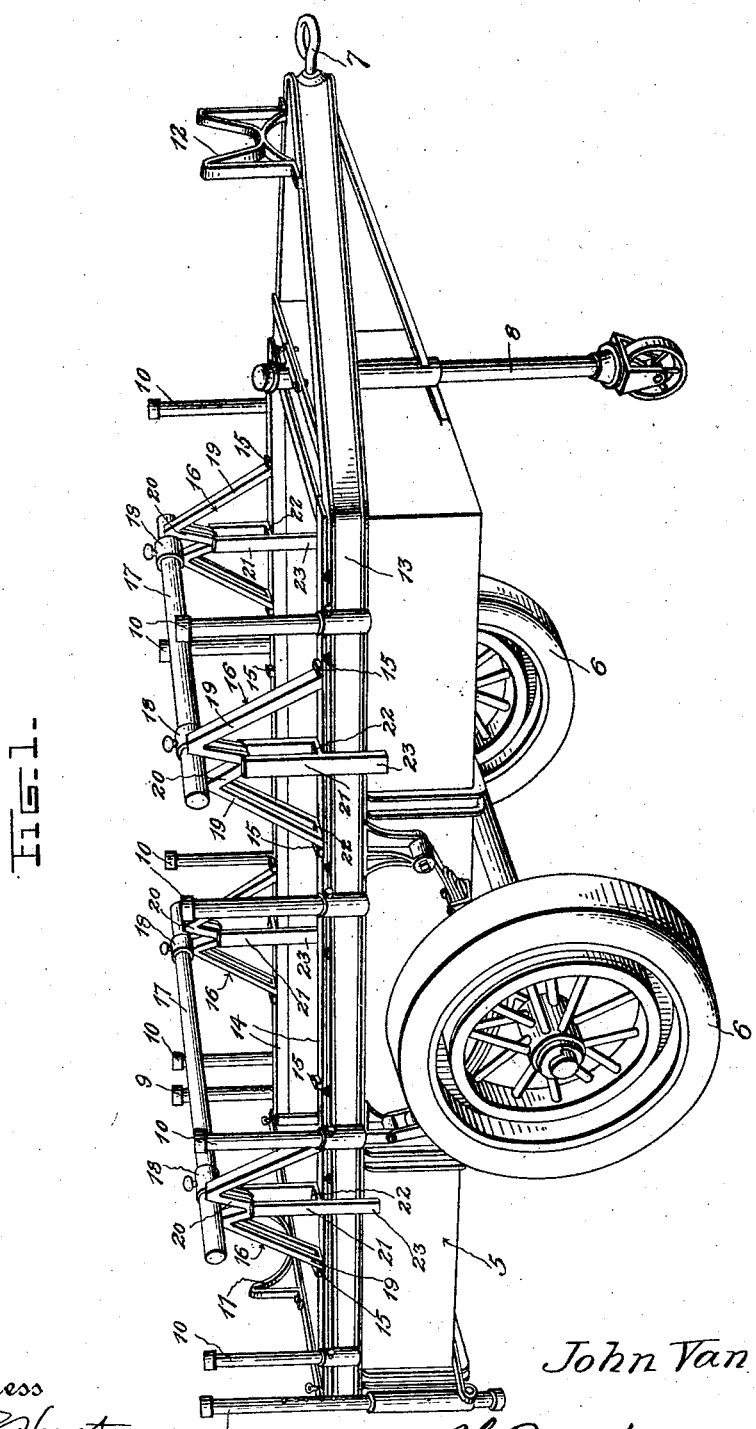

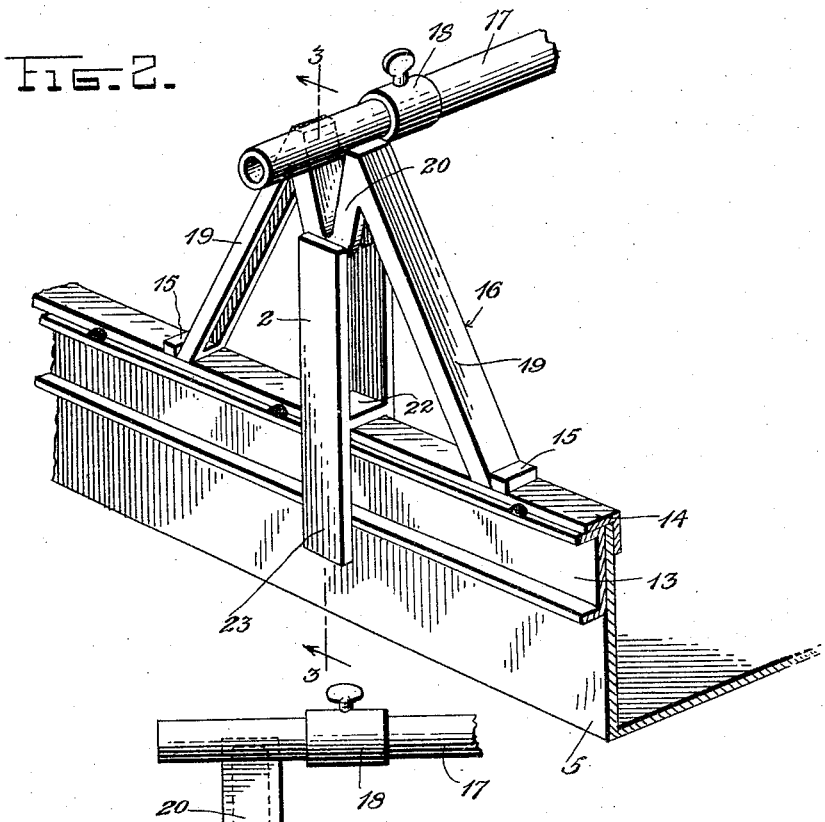
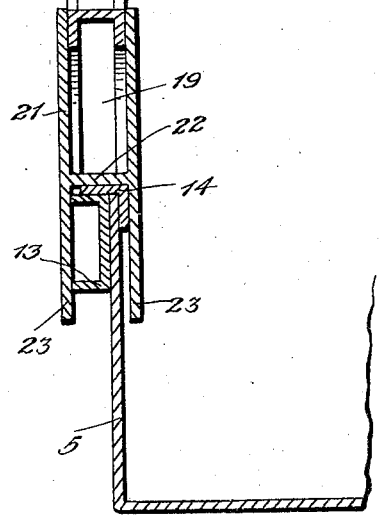

1,895,217

UNITED STATES PATENT OFFICE

JOHN VAN VORST, OF SCHENECTADY, NEW YORK

REEL CARRIER

Application filed June 8, 1931. Serial No. 542,959.

The invention aims to provide novel means for supporting one or more reels of wire upon a trailer or the like, such as those used by linemen, and with this end in view, the invention resides in the novel subject matter hereinafter described and claimed, description being accomplished by reference to the accompanying drawings.

Fig. 1 is a perspective view of a lineman's service trailer equipped with the invention.

Fig. 2 is an enlarged fragmentary perspective view.

Fig. 3 is a vertical sectional view substantially on line 3—3 of Fig. 2.

The trailer herein disclosed includes a body 5 supported by appropriate wheels 6 and having a suitable hitch 7. The parts 8 and 9 are merely vertically adjustable front and rear legs with which the present application is not concerned, the numerals 10 denote side stakes which may be used when hauling lumber, poles, etc., and the parts 11 and 12 denote central seats for a telephone pole or the like when such pole is to be centrally carried on the trailer. The present application is not concerned, as above stated, with the parts 8 and 9, nor with the parts 10, 11 and 12.

The upper part of the body 5 is suitably secured to the chassis frame 13 of the trailer and is reinforced by angle metal bars 14 disposed in horizontal parallel relation with each other. At spaced points, the bars 14 are provided with rigidly attached lugs 15 which are preferably welded thereon. These lugs are instrumental in holding any desired number of reel-shaft-supporting frames 16 against shifting longitudinally of the bars 14. The reel shafts 17 are shown provided with collars 18 engaging the inner sides of the frames 16 so that said shafts cannot shift transversely of the body 5.

All of the frames 16 are of the same construction and hence a description of one will suffice for all.

Each frame 16, in the present disclosure, embodies an inverted V-shaped bar 19 having an integral V-shaped bearing 20 at its upper end to engage the shaft 17, whether the latter be small or large, the lower extremities of said bar 19 being adapted to rest upon the bars 14 and to abut the inner opposed sides of any two of the adjacent lugs 15. A central supporting leg 21 is rigidly secured to the lower portion of the bearing 20 by welding or in any other desired way, said leg having a horizontal foot 22 to rest upon the bar 14 and being provided with two rigid downwardly projecting arms 23 to straddle the upper portions of the body 5 and the chassis frame 13, thereby bracing the frame 16 against lateral tilting.

The frames 16 may be applied at any desired points to the body 5 and will be held in place by the lugs 15, and when the use of these frames is not required, they may be simply lifted off. When they are in use, they serve to effectively support a reel or reels of wire upon the trailer or the like, for use in the well known ways.

Excellent results are obtainable from the general construction herein disclosed and such construction may therefore be considered as preferred. However, within the scope of the invention as claimed, variations may of course be made.

I claim:—

1. In a reel shaft support, a horizontal bar having two longitudinally spaced upwardly projecting lugs on its upper side, a vertical frame resting upon and straddling said bar between said lugs, said frame being free of attachment to said bar and abutting said lugs, and a reel shaft bearing carried by said frame.

2. In a reel shaft support, a horizontal bar having two longitudinally spaced upwardly projecting lugs on its upper side, a reel shaft bearing above said bar, two supporting legs diverging downwardly from said bearing and resting upon said bar, said legs abutting the inner opposed sides of said lugs, and a third leg projecting vertically downward from said bearing, said third leg having a horizontal foot resting upon said bar and being provided with two arms projecting downwardly beyond said foot and straddling said bar.

3. In a reel shaft support, a reel shaft bearing, two supporting legs integral with said bearing and diverging downwardly therefrom to rest on a support, and a third leg rigidly joined to said bearing and projecting vertically downward therefrom, said third leg having spaced parallel side members and a foot between and integral with said side members, said foot being spaced above the lower ends of said side members and disposed in the same horizontal plane with the lower ends of said diverging legs, whereby said foot and said diverging legs may rest on the support and the portions of said side members below said foot may straddle said support.

4. In a reel shaft support, a V-shaped reel shaft bearing, two supporting legs integral with the upper terminals of said V-shaped bearing and diverging downwardly therefrom to rest on a support, and a third leg projecting vertically downward from said V-shaped bearing, said third leg having spaced parallel side members and a foot between and integral with said side members, the upper ends of said side members being rigidly secured against opposite sides of said V-shaped bearing, said foot being spaced above the lower ends of said side members and disposed in the same horizontal plane with the lower ends of said diverging legs, whereby said foot and said diverging legs may rest on the support and the portions of said side members below said foot may straddle said support.

In testimony whereof I affix my signature.

JOHN VAN VORST.